(12) United States Patent
Margolis et al.

(10) Patent No.: US 8,184,812 B2
(45) Date of Patent: May 22, 2012

(54) SECURE COMPUTING DEVICE WITH MONOTONIC COUNTER AND METHOD THEREFOR

(75) Inventors: Evgeni Margolis, Gilbert, AZ (US); Thomas E. Tkacik, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 440 days.

(21) Appl. No.: 12/477,560

(22) Filed: Jun. 3, 2009

(65) Prior Publication Data

US 2010/0313056 A1 Dec. 9, 2010

(51) Int. Cl.
- H04N 7/167 (2011.01)
- H04N 1/44 (2006.01)
- H04L 9/00 (2006.01)
- H04K 1/00 (2006.01)
- G06F 7/04 (2006.01)
- G06F 11/00 (2006.01)

(52) U.S. Cl. ........ 380/260; 380/221; 380/225; 380/244; 380/274; 726/16; 726/23

(58) Field of Classification Search .................. 380/221, 380/225, 244, 260, 274; 726/16, 23
See application file for complete search history.

(56) References Cited

U.S. PATENT DOCUMENTS

| | | | |
|---|---|---|---|
| 5,471,451 A * | 11/1995 | Masaki et al. | 369/71 |
| 6,327,652 B1 | 12/2001 | England et al. | |
| 6,687,325 B1 * | 2/2004 | Wells | 377/26 |
| 6,836,853 B1 * | 12/2004 | Dover et al. | 713/502 |
| 6,862,641 B1 * | 3/2005 | Strongin et al. | 710/260 |
| 2002/0087872 A1 | 7/2002 | Wells et al. | |
| 2004/0086073 A1 * | 5/2004 | Wuidart et al. | 377/2 |
| 2006/0020941 A1 | 1/2006 | Inamura et al. | |
| 2006/0271796 A1 | 11/2006 | Kaimal et al. | |
| 2008/0320263 A1 | 12/2008 | Nemiroff et al. | |

FOREIGN PATENT DOCUMENTS

WO WO2008/015496 A1 2/2008

OTHER PUBLICATIONS

Sarmenta et al., "Virtual Monotonic Counters and Count-Limited Objects using a TPM without a Trusted OS," STC'06, Nov. 3, 2006, Alexandria, Virginia, USA.

* cited by examiner

*Primary Examiner* — Mohammad Reza
(74) *Attorney, Agent, or Firm* — Meschkow & Gresham, P.L.C.

(57) ABSTRACT

A secure computing device (14) includes a secure processing section (30) having a tamper detection circuit (58) and a monotonic counter (68). The tamper detection circuit (58) detects an event which suggests that the trust associated with the secure processing section (30) may have been compromised. When such an event is detected, a security breach is declared and trusted software (38) is disabled. After a security breach is declared, the monotonic counter (68) may be reclaimed. The monotonic counter (68) provides a monotonic count value (70) that includes an LSB portion (80) and an MSB portion (82). The LSB portion (80) is obtained from a binary counter (72). The MSB portion (82) is obtained from a register (84) of independent one-time-programmable bits. The monotonic counter (68) is reclaimed by programming one of the one-time programmable bits to guarantee that future counting of the monotonic counter will be monotonic relative to all past counting.

20 Claims, 6 Drawing Sheets

SECURE COMPUTING DEVICE WITH MONOTONIC COUNTER AND METHOD THEREFOR

TECHNICAL FIELD OF THE INVENTION

The present invention generally relates to data security in electronic computing devices. More specifically, the present invention relates to monotonic counters and to the use of monotonic counters in electronic computing devices.

BACKGROUND OF THE INVENTION

A monotonic counter may be implemented to produce increasing values or decreasing values. For the increasing values implementation, once the count value changes to a higher number, it should not thereafter exhibit any value less than the higher number. For the decreasing values implementation, once the count value changes to a lower number, it should not thereafter exhibit any value greater than the lower number. For either implementation, the monotonic nature of the count value should be maintained throughout the life of the device in which the monotonic counter operates, including across any number of power-on and power-off cycles.

Secure computing devices perform operations and/or are otherwise configured to ensure the legitimacy, integrity, privacy, and/or authenticity of at least some of the data they process. Such devices may use a secure microprocessor or the like, which includes physical and logical features to provide a secure execution environment (SEE). The SEE, also called a trusted platform, security zone, and the like, may include software and/or hardware features which promote a high level of trust in the data security operations the device may undertake, making the security features of the device nearly immune to malicious software that the device may accidentally or intentionally execute from time to time. Desirably, a monotonic counter is implemented as part of the SEE so that its monotonic operation is nearly immune to malicious software and so that its monotonic count value may be trusted to a high degree of confidence throughout the normal life of the device.

As an example, secure computing devices may rely upon monotonic counters to implement offline, decentralized applications, and other applications that might otherwise be prone to replay attacks. Replay attacks represent a type of malicious activity where data, including encrypted data, which were perfectly legitimate at an earlier time, are replayed at a later time, after the data has become illegitimate. Without some feature, such as a monotonic counter, the now illegitimate data may decrypt successfully, leading to an illegitimate use of the data.

An off-line payment system represents an exemplary application that may use a monotonic counter to prevent replay attacks. In this exemplary application, a credit issuer stores credit balances on users' secure computing devices. When a user makes a purchase, a merchant may verify the credit balance and reduce this balance using data stored on the user's device, all without communicating with the credit issuer. The balance verification and reduction may be accomplished using a secure cryptographic encryption scheme known only to the credit issuer and the merchant. The encryption scheme allows the credit issuer and merchant to be confident that the user has not altered data previously written on the user's device. But the merchant and credit issuer also want to be confident that the user's device is not merely replaying a previously legitimate higher credit balance in an attempt to double-spend the user's credit. Thus, when a transaction takes place with a merchant, the merchant may increase a monotonic counter in the user's device, and then write a data object to the user's device that stores an encrypted version of the new count value, a new credit balance, and a digital signature. Later, when the same or a different merchant investigates the user's credit balance, the merchant may verify that the recorded count value encrypted in the data object matches the actual monotonic counter's then-current output and be confident that no replay attack is being attempted. If a replay attack were being attempted, the actual monotonic counter output would be higher than the recorded count value encrypted in the data object. If the monotonic counter is not securely monotonic, the device which relies upon the monotonic counter will be susceptible to a replay attack. Many other applications may also benefit from the use of a monotonic counter, including virtual trusted storage, e-wallet, and digital rights management.

Conventional secure computing devices with monotonic counters include a variety of hardware and software techniques to determine whether a security breach has occurred. These techniques are used in accordance with a design philosophy that believes users should use their secure computing devices in a manner that does not lead to a breach in security. Consequently, certain possible events which are deemed to be security breaches lead to the conclusion that the secure computing device has been compromised and should not thereafter be reused.

This conventional scheme for declaring secure computing devices with monotonic counters to be unusable after a security breach is too harsh. Secure computing devices with monotonic counters may be expensive devices, and they may be the property of their users, who will be unhappy to have their expensive devices being declared unusable.

Moreover, security may be deemed to be breached for a variety of reasons, some of which do not truly suggest a security problem. In order to have a low probability of false negative errors in declaring security breaches, the designs of some secure computing devices may accept a larger probability of false positive errors than is desirable. In other words, in order to catch virtually all legitimate security breaches, a secure computing device may declare some events as security breaches which should not be so declared. For example, the removal or failure of a battery that energizes certain security features in the SEE may be viewed as a security breach in some devices. And, normal human accidents which lead to dropping a secure computing device, immersing it in water, overheating it, and the like, may be viewed as security breaches even though the affected devices may otherwise be functional or easily be made functional after the accidents.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

Figure 1:
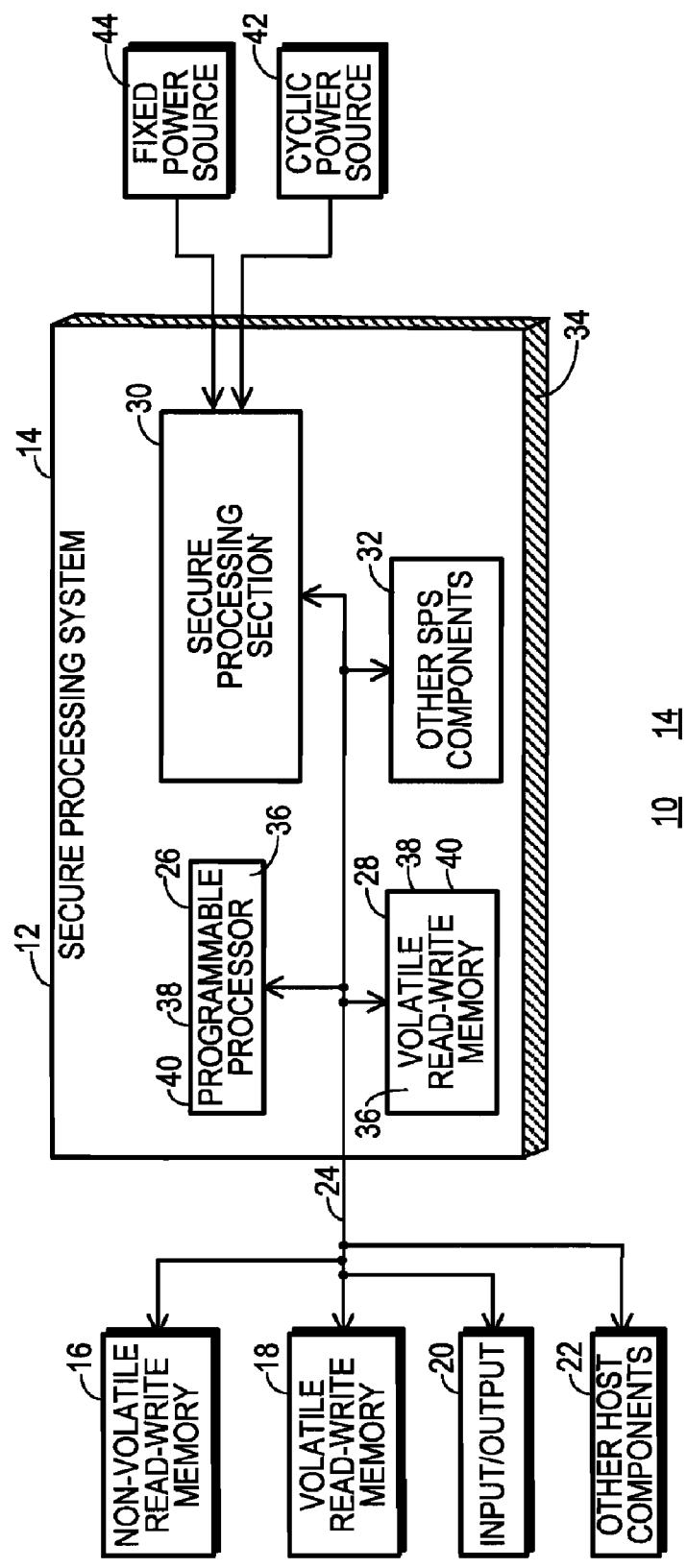
FIG. 1 shows a block diagram of a host secure computing device that utilizes a secure processing system.

FIG. 1 shows a block diagram of a host device 10 that uses a secure processing system 12. Secure processing system 12 is a secure computing device 14 because it performs operations and/or is otherwise configured to ensure the legitimacy, integrity, privacy, and/or authenticity of at least some of the data it processes. Likewise host device 10 is a secure computing device 14 because it performs operations and/or is otherwise configured to ensure the legitimacy, integrity, privacy, and/or authenticity of at least some of the data it processes.

Secure computing device 14 is configured so that it may be refurbished after a security breach has been declared. Self testing software may be downloaded and executed in secure computing device 14, or special testing equipment may be used to verify that hardware is functioning correctly after a security breach has occurred. And, new software, including trusted software, may be loaded onto secure computing device 14 as part of a refurbishment process. But secure computing device 14 includes a monotonic counter (discussed below) that complicates the refurbishment process. Desirably, a monotonic counter should be incapable of being reset or otherwise exhibiting a previously produced count value. And, after a security breach has been declared its current value is often considered unreliable. Accordingly in secure computing device 14 the monotonic counter is desirably configured to be reclaimable after a security breach occurs.

Secure computing device 14 in the form of host device 10 may be configured for any of a wide variety of different data-processing applications, including smart card, e-wallet, server, point-of-sale terminal, wireline or wireless telephony, radio, personal computer, laptop, handheld computer, workstation, digital media player, router, modem, industrial controller, and the like.

As depicted in FIG. 1, in addition to secure processing system 12, host device 10 may include a non-volatile read-write memory 16, a volatile read-write memory 18, an input/output section 20, and other host components 22 of a type and configuration understood to those skilled in the art of data processing and computerized devices. Non-volatile read-write memory 16 retains its data contents across power-off, power-on cycles for host device 10, while data stored in volatile read-write memory 18 is destroyed when power for host device 10 cycles off. Memory 16, memory 18, section 20, and other components 22 couple together and to secure processing system 12 through a bus 24 that conveys data, addresses, and control signals.

Among other things, secure computing device 14 in the form of secure processing system 12 provides data security services, including a monotonic counter, for host device 10. In the embodiment depicted in FIG. 1, secure processing system 12 provides other data processing services as well. For example, secure processing system 12 includes a programmable processor 26, which may be viewed as a central processing unit (CPU), processor, controller, microcontroller, microprocessor, or the like. Programmable processor 26 may, but is not required to, be the only programmable processor for host device 10.

A programmable processor, such as programmable processor 26, differs from an unprogrammable processor in that the software, programming instructions, or code it executes may be changed or augmented in some way after host device 10 has been manufactured. Security considerations for host device 10 are evaluated under the assumption that a programmable processor, such as programmable processor 26, may be vulnerable to malicious code, such as software viruses, trojans, worms, software bugs, and the like. Desirably, host device 10 is configured to minimize the likelihood of malicious code being executed on programmable processor 26, but no requirement exists for guaranteeing that programmable processor 26 is absolutely prevented from executing malicious code.

Programmable processor 26 couples to bus 24 as does a volatile read-write memory 28, a secure processing section 30, and other secure processing system (SPS) components 32. Desirably, processor 26, memory 28, secure processing section 30, and other SPS components 32 are all formed together on a common semiconductor substrate and are packaged together and reside within a single integrated circuit 34.

Secure processing section 30 provides a secure execution environment (SEE) for secure processing system 12 and host device 10. In large part, secure processing system 12 provides security services through the operation of secure processing section 30. These services include the provision of a monotonic counter and may include other security services, such as secure storage, key retention, random number generation, key generation, encryption, decryption, hashing, and the like. These services are usually provided in connection with data being processed by host device 10.

The movement of data into and out of secure processing system 12 and other activities performed by secure processing system 12 may be controlled by programmable processor 26, as defined by programming code 36. Programming code 36 is executed by programmable processor 26 and may be stored in any one or more of memories 16, 18, 28 and/or other SPS components 32, or programming code 36 may be considered to be a part of programmable processor 26.

Programming code 36 may be characterized as trusted software 38 or untrusted software 40. Trusted software 38 is usually configured so that its integrity and authenticity can be verified prior to and/or during execution, and it is usually designed so that it executes in controlled conditions, such as with certain interrupts disabled, to preclude concurrent execution of untrusted software 40. Untrusted software 40 is any software that does not meet the conditions of trusted software 38. Trusted software 38 may be allowed to cause secure processing system 12 to operate in a secure or trusted mode which permits greater access to the security services provided by secure processing section 30. Usually, programming code 36 which legitimately processes data for which security measures are provided, such as digital rights management, off-line payment systems, e-wallets, and the like, is of the trusted software 38 variety. A security breach which prevents trusted software 38 from executing often makes host device 10 unusable for one or more of the applications for which host device 10 is provided.

FIG. 1 depicts the use of two different power sources. Both a cyclic power source 42 and a fixed power source 44 couple to secure processing system 12, and particularly to secure processing section 30 of secure processing system 12 in the embodiment depicted in FIG. 1. Cyclic power source 42 is intended to provide the primary power for host device 10 and secure processing system 12. Cyclic power source 42 may be turned off so as to supply no voltage when host device 10 is not being used, and then turned back on when host device 10 is to be used. Cyclic power source 42 may be provided by a switched battery, by a power supply that draws energy from a public power distribution network or in any other way known to those skilled in the art. Fixed power source 44 may be provided by a battery that is hard wired or otherwise configured to supply a fixed voltage that is not removed through the operational life of host device 10. In other words, fixed power source 44 is not intended to be turned off and on. A Li-ion button battery may suffice for fixed power source 44.

Figure 2:
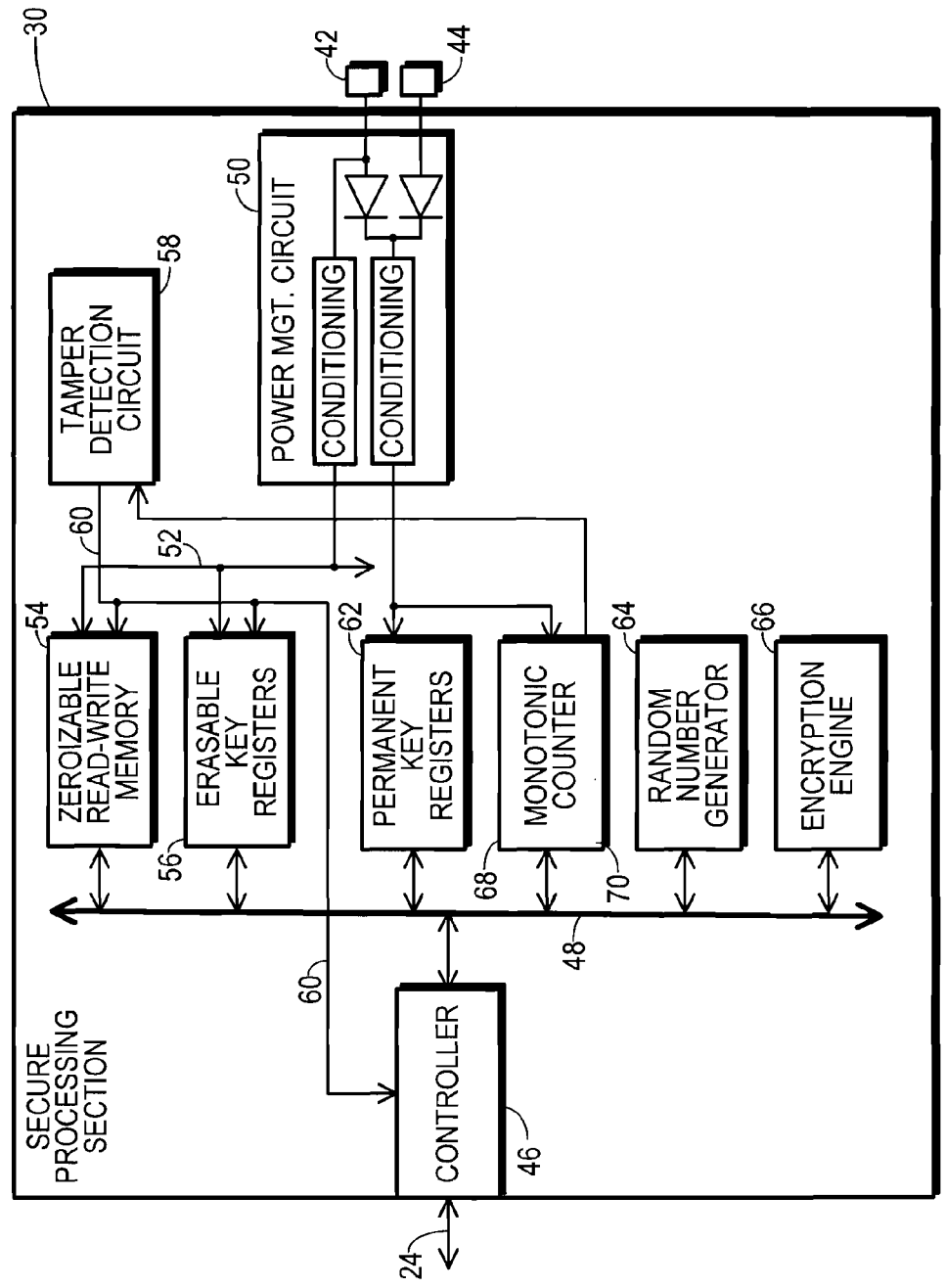
FIG. 2 shows a block diagram of a secure processing section of the secure processing system depicted in FIG. 1.

FIG. 2 shows a block diagram of secure processing section 30 from secure processing system 12. Secure processing section 30 operates under the control and management of a controller 46. FIG. 2 depicts controller 46 serving as an interface between the data, addresses, and signals of bus 24 outside of secure processing section 30 and the data, address, and signals of a data, address, and control signal bus 48 located within secure processing section 30.

Controller 46 may be implemented in a wide variety of ways. In one embodiment, a separate programmable device, such as a microprocessor, serves as controller 46, and data passing into and out from secure processing section 30 physically passes through controller 46. In another embodiment, such data does not physically pass through controller 46, but controller 46 is configured to control whether data may pass into and out from secure processing section 30 as well as to control the movement of data and control signals within secure processing section 30. In another embodiment, controller 46 is distributed so as to have separate control functions associated with the various components of secure processing section 30 and to control the flow of data into and out from secure processing section 30. And, in another embodiment controller 46 may be implemented by programmable processor 26 (FIG. 1) operating in its secure or trusted mode. In this embodiment, controller 46 may represent a control register and trusted software 38 (FIG. 1) that together control the flow of data into, out from, and within secure processing section 30 as well as the manner in which various operations are carried out within secure processing section 30. These and other forms of controller 46 may be used in connection with secure processing section 30.

FIG. 2 shows that power inputs from cyclic power source 42 and fixed power source 44 are applied to secure processing section 30 at a power management circuit 50. A cyclic power output 52 of power management circuit 50 supplies power from cyclic power source 42 to the majority of components of secure processing section 30. This power cycles off and on during the life cycle of host device 10 as cyclic power source 42 cycles off and on. Cyclic power output 52 drives at least a zeroizable read-write memory 54 and erasable key registers 56. Data, address, and control signal bus 48 also couples to zeroizable read-write memory 54 and to erasable key registers 56.

Zeroizable read-write memory 54 desirably provides secure memory for secure processing system 12 and host device 10 (FIG. 1). Its contents are protected against the execution of malicious software within host device 10 due to the trust provided by secure processing section 30. In general, secure memory 54 is used in buffering blocks of data moving into and out from secure processing section 30 in support of cryptographic operations. Desirably memory 54 is configured as a volatile memory whose data contents are destroyed when cyclic power output 52 cycles off. The use of volatile memory promotes security by preventing data from being retained in memory 54 when it is not specifically under the control of trusted software 38.

Erasable key registers 56 may be used to store cryptographic keys that are specifically intended to be destroyed from time to time. Desirably, erasable key registers 56 are configured as volatile registers whose contents are destroyed when cyclic power output 52 cycles off. The use of volatile registers promotes security by preventing the keys stored therein along with any data encrypted using such keys from having a long life span and from being available to potentially untrusted software 40. In one embodiment, erasable key registers 56 are formed as a section of zeroizable read-write memory 52, but registers 56 are shown as a separate section in FIG. 2 due to their function in retaining cryptographic keys.

Secure processing section 30 also includes a tamper detection circuit 58. Tamper detection circuit 58 is configured to detect characteristics of the physical environment which suggest that secure processing system 12 might not be operating properly. One or more of such characteristics are likely to be experienced if a saboteur attempts to tamper with host device 10 in an effort to discover or manipulate private security parameters that are stored therein. Examples of private security parameters include secret keys and a monotonic count value, discussed below.

In one embodiment tamper detection circuit 58 includes a number of different sensors. The activation of any one of the sensors may cause a tamper signal 60 to activate. The sensors may include, for example, a temperature sensor, clock sensor, voltage sensor, and external sensors integrated into the design of a circuit card or housing on which or in which secure processing system 12 may be located or included within secure processing system 12 itself. Any of the tamper detection techniques and circuits known by those skilled in the art may be incorporated, in whole or in part, within tamper detection circuit 58.

Tamper signal 60 is routed, directly or indirectly, from an output of tamper detection circuit 58 at least to an input of zeroizable memory 54, an input of erasable key registers 56, and an input of controller 46. In one embodiment, tamper signal 58 is configured to cause power to be removed from zeroizable memory 54 and erasable key registers 56. In another embodiment, tamper signal 60 is configured to clear the contents of zeroizable memory 54 and erasable key registers 56.

When a tamper event is detected by tamper detection circuit 58, tamper signal 60 activates, signaling a security breach. The signaling of a security breach means that secure processing section 30 has become unreliable and the trust associated with secure processing section 30 has been compromised. When tamper signal 60 activates, the contents of zeroizable memory 54 and erasable registers 56 are destroyed (e.g., zeroized). And, controller 46 is informed of the security breach by an appropriate mechanism, such as through an interrupt. Destroying the contents of zeroizable memory 54 and erasable key registers 56 may make much of host device 10 unusable and is likely to disable trusted software 38 without further action. Desirably, controller 46 takes further action to prevent the processing of sensitive data in host device 10, to disable trusted software 38, and to inform a user of the security breach. The further action which prevents the processing of sensitive data may include destroying any other cryptographic keys that may remain in secure processing section 30 and possibly destroying trusted software 38 as well.

Secure processing section 30 also desirably includes permanent key registers 62. Key registers 62 couple to data, address and control signal bus 48. Key registers 62 desirably store one or more cryptographic keys in a manner that insures that, under normal operating conditions, they will remain valid for an extended period of time, which includes any number of power cycles for host device 10.

Some of permanent key registers 62 may be configured as non-volatile registers. Such non-volatile registers 62 retain their contents even after power has been removed and reapplied. Some of permanent key registers 62 may be configured as read-only registers while others may be configured as read-write registers. Permanent key registers 62 configured as read-write registers are desirably erased when a security breach is declared. And, some of permanent key registers 62 may be configured as volatile registers with battery back-up, a configuration which is specifically depicted in FIG. 2. Thus, power management circuit 50 may be configured so that the power for permanent key registers 62 is supplied by cyclic power source 42 when cyclic power source 42 is switched on and by fixed power source 44 when cyclic power source 42 is switched off. In other words, power management circuit 50 may cause fixed power source 44 to function as a battery backup with respect to permanent key registers 62.

Secure processing section 30 desirably includes a random number generator 64 which couples to data, address and control signal bus 48. Desirably, random number generator 64 is a hardware-implemented random number generator whose random number generation processes and/or algorithms cannot be altered after secure processing system 12 has been manufactured. Random number generator 64 generates random numbers when requested to do so by controller 46, and such random numbers may then be moved and stored in other components of secure processing section 30, or more generally host device 10, for subsequent use.

Secure processing section 30 also includes an encryption engine 66 coupled to data, address, and control signal bus 48. In the preferred embodiment, encryption engine 66 provides encryption logic circuitry capable of implementing a variety of symmetric and/or asymmetric cryptographic algorithms for the encryption of plaintext data into ciphertext data and for the decryption of the ciphertext data back into the plaintext data, along with other algorithms, such as hashing, which are useful in cryptographic operations.

Secure processing section 30 also includes a monotonic counter 68. Monotonic counter 68 is configured to count (e.g., increment or decrement) when requested to do so and to produce a monotonic count value 70 to the data portion of address, data, and control signal bus 48 in response to a read operation. Monotonic counter 68 may be implemented to produce increasing values or decreasing values. For an increasing values implementation, once monotonic count value 70 changes to a higher number, it does not thereafter exhibit a value less than the higher number. For a decreasing values implementation, once monotonic count value 70 changes to a lower number, it does not thereafter exhibit a value greater than the lower number. For either implementation, the monotonic nature of monotonic count value 70 is maintained throughout the life of host device 10, including across a number of power-on and power-off cycles, security breaches, and/or refurbishment operations. In one embodiment, at least a portion of monotonic counter 68 receives a power signal from power management circuit 50 that provides battery back-up, as discussed above in connection with permanent key registers 62, allowing this portion of monotonic counter 68 to be continuously energized. An output of monotonic counter 68 couples to tamper detection circuit 58.

Figure 3:
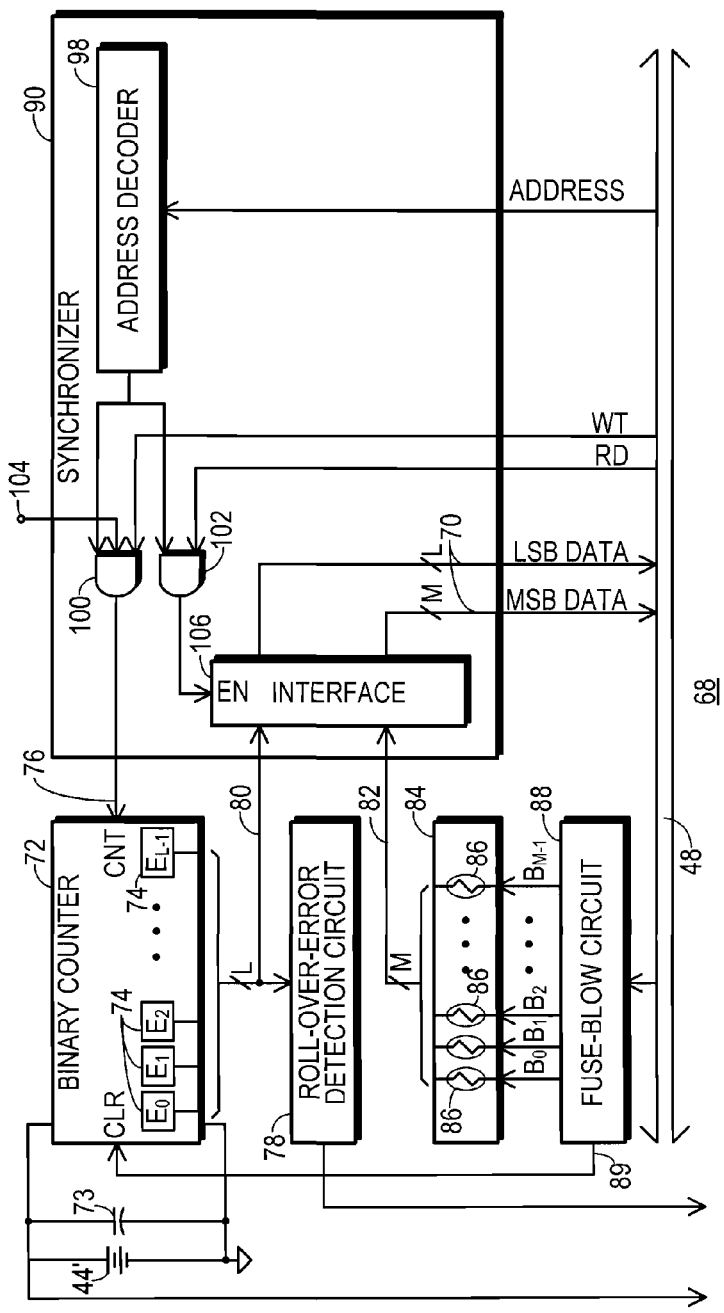
FIG. 3 shows a block diagram of a first embodiment of a monotonic counter shown in FIG. 2.

FIG. 3 shows a block diagram of a first embodiment of monotonic counter 68. Monotonic counter 68 includes a binary counter 72. In one embodiment, binary counter 72 includes L volatile memory elements 74, where L is an integer number, and each memory element records the state of a single bit of data for binary counter 68. FIG. 3 denotes memory elements 74 as $E_0$ through $E_{L-1}$. In this embodiment, binary counter 72 is energized by a battery 44', which may represent fixed power source 44 discussed above in FIGS. 1-2 or may be provided by another fixed power source dedicated to energizing binary counter 72. A capacitor 73 couples across battery 44' to maintain energization to binary counter 72 throughout any momentary disruption in a connection with battery 44' that may result from dropping host device 10. Thus, in this embodiment, binary counter 72 remains continuously energized by battery 44'. Desirably, tamper detection circuit 58 (FIG. 2) is configured to specifically monitor voltage to binary counter 72 and to declare a security breach if this voltage is disrupted.

In another embodiment, memory elements 74 are configured as non-volatile memory elements. In this embodiment, battery 44' and specific monitoring of voltage to binary counter 72 by tamper circuit 58 may be omitted.

Binary counter 72 may be configured to increment or decrement. In either implementation, binary counter 72 is configured to perform an arithmetic operation in response to an activation of a count signal 76. In the incrementing implementation, binary counter 72 performs an arithmetic add operation, where a first addendum is provided by the current state of binary counter 72 as represented by memory elements 74, and a second addendum is a positive integer, preferably the integer one. But in an alternate embodiment the second addendum may be a positive integer which changes for different add operations. In the decrementing implementation, binary counter 72 performs an arithmetic subtraction operation, where the minuend is provided by the current state of binary counter 72 as represented by memory elements 74, and the subtrahend is a positive integer, preferably the integer one. But in an alternate embodiment the subtrahend may be a positive integer which changes for different subtraction operations. Although not shown in FIG. 3, binary counter 72 may include other circuitry conventionally included in counter circuits, including arithmetic logic circuitry to implement the above discussed add or subtract operations and carry circuitry which controls when to propagate a carry to a next more significant bit. In the preferred embodiment, the output of binary counter 72 is treated as an unsigned integer. Thus, binary counter 72 counts in an unsigned integer number space which extends from 0 to $2^L-1$, or vice-versa, and presents up to $2^L$ unique values, depending on the number of count operations asked of binary counter 72 and the values used for the second addendum or subtrahend. The count value from binary counter 72 may exhibit any value in the range of 0 to $2^L-1$ which is greater than a previously exhibited value for the incrementing implementation or which is less than a previously exhibited value for the decrementing implementation.

Desirably, the integer L is sized to provide a generous lifetime for host device 10. In particular, L is sufficiently large to accommodate counting within a number space that will not be exhausted during the expected lifetime for host device 10, with a margin for variability in the number of counts binary counter 72 will be asked to make and the expected lifetime. Moreover, host device 10 may implement a plurality of applications each of which requires its own monotonic counter. In this situation, the plurality of monotonic counters may be implemented virtually through the execution of trusted software 38, with monotonic counter 68 being used to cryptographically cover the plurality of virtual monotonic counters. And, in this situation, monotonic counter 68 may be asked to count each time any one of the plurality of virtual monotonic counters is asked to count, causing the number space within which binary counter 72 counts to be sufficiently large to accommodate all of the plurality of virtual monotonic counters. In the preferred embodiment, the integer L is 48 bits to provide for a generous lifetime for host device 10 and a plurality of virtual monotonic counters, but this precise value is no requirement.

Monotonic counter 68 also includes a roll-over-error detection circuit 78. Roll-over-error detection circuit 78 couples to counter 72 and is configured to detect if the count value output from binary counter 72 rolls over. Rolling over refers to a binary count which produces a result that should be outside the range of 0 to $2^L-1$, but cannot be properly represented using only L memory elements 74. For the unsigned integer representation of numbers output by binary counter 72, this event corresponds to an output which has rolled over from all ones to all zeros, or vice-versa. This event should not happen for the normal, legitimate operation of host device 10 at any time over a generous lifetime due to the size of integer L (i.e., the number of memory elements 74), discussed above. Its occurrence suggests some sort of illegitimate operation has taken place for host device 10. Desirably, an output from roll-over-error detection circuit 78 couples to tamper detection circuit 58, and when a roll-over-error is detected, a security breach is declared. While FIG. 3 shows roll-over-error detection circuit 78 as being separated from binary counter 72, in one embodiment it is provided by a carry output from the most significant bit from the L memory elements 74 from binary counter 72.

The count output from binary counter 72 provides a least significant bits (LSB) portion 80 of monotonic count value 70 supplied by monotonic counter 68 in response to a read operation. A most significant bits (MSB) portion 82 of monotonic count value 70 is provided by a register 84 of independent one-time programmable bits. In one embodiment, register 84 includes M fusible links 86, where M is a positive integer number. Fusible links 86 may be blown at any point during the lifetime of host device 10 through signals provided by a fuse-blow circuit 88, which couples to register 84. Each fusible link 86 may be blown only one time during the lifetime of secure processing system 12, and after a fusible link 86 is blown it cannot thereafter be "unblown". And, each fusible link 86 may be blown without blowing any other fusible link 86 at the same time. Hence, register 84 provides one-time programmable bits, and the one-time programmable bits are independently programmable from one another. The states of the one-time-programmable bits of register 84 are retained across power off, power on cycles, so register 84 is a non-volatile register.

Fuse-blow circuit 88 couples to and receives control data from address, data, and control signal bus 48. Accordingly, software 36 (FIG. 1) determines which bits in fuse-blow circuit 88 to blow and when to blow them. Preferably, such software is configured as trusted software 38 (FIG. 1) but does not reside in host device 10 during the normal operation of host device 10. Instead, it is temporarily loaded onto host device 10 at initial manufacture and/or during a refurbishing operation to blow a selected bit, and then destroyed on host device 10 as soon as the selected bit is blown.

Register 84 has a different physical structure from binary counter 72 and consequently exhibits different failure modes. For example, the removal of battery 44', a roll-over error, and/or other events monitored by tamper detection circuit 58 (FIG. 2) may indicate that LSB portion 80 of monotonic count value 70 has not acted in a monotonic manner due to the physical structure of binary counter 72. But due to the physical structure of fusible links 86, such events do not indicate that MSB portion 82 has failed to act in a monotonic manner. Because of this difference in physical structure, monotonic counter 68 may be reclaimed when a security breach is declared.

Due to the one-time programmable nature of the bits of register 84, MSB portion 82 is configured to present up to M+1 unique values. Since binary counter provides up to $2^L$ unique values and register 84 provides up to M+1 unique values, monotonic count value 70 presents up to $2^L*(M+1)$ unique values using L+M bits. In the preferred embodiment, the integer M equals sixteen, so MSB portion 82 presents up to 17 unique values. But nothing requires M to equal this precise value. Assuming that register 84 is configured so that a blown bit presents a value of one, which is not a requirement of register 84, then register 84 exhibits monotonic behavior by presenting a new value which is greater than any previously presented value every time another bit is blown, regardless of the order in which bits are blown.

Accordingly, monotonic count value 70 is presented through MSB portion 82 and LSB portion 80. LSB portion 80 by itself covers sufficient numeric space to provide a generous lifetime for host device 10. But in the event of a security breach, monotonic counter 68 may be reclaimed by blowing another bit in register 84. Even if LSB portion 80 of monotonic count value 70 exhibited non-monotonic behavior in the event that resulted in a security breach being declared, the blowing of another bit in register 84 makes a more significant monotonic contribution to count value 70 than any possible non-monotonic contribution to count value 70 made by binary counter 72. As a result, monotonic count value 70 is guaranteed to have maintained its monotonic character after the blowing of any one-time programmable bit in register 84.

Since register 84 includes M bits, monotonic counter 68 may be reclaimed after up to M different security breaches. But in the FIG. 3 embodiment, an output 89 from fuse-blow circuit 88 couples to a clear or preset input of binary counter 72. This output activates whenever any one-time programmable bit is blown in register 84 and forces binary counter 72 to a known state. In this embodiment, a first one-time programmable bit is blown in register 84 during the initial manufacture of host device 10 to place counter 72 in a known state. Consequently, monotonic counter 68 reclamation may occur for only M−1 security breaches. Since security breaches should be rare events and since providing for a generous lifetime for host device 10 is a desirable feature, in the preferred embodiment, the integer L is greater than the integer M.

Monotonic counter 68 also includes a synchronizer 90. Synchronizer 90 synchronizes count signal 76 with a read operation for monotonic count value 70 to prevent count value 70, and particularly LSB portion 80 thereof, from changing or appearing to change during the read operation. In the embodiment depicted in FIG. 3, an atomic read operation is performed to supply monotonic count value 70 to the data portion of data, address, and control signal bus 48.

Figure 4:
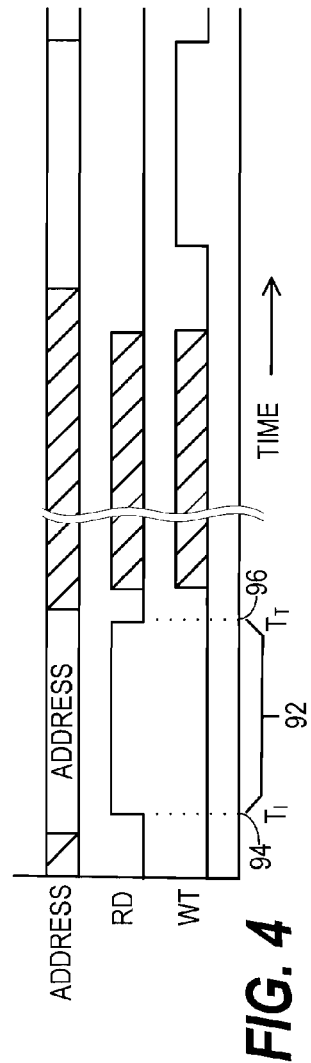
FIG. 4 shows a timing diagram which describes the operation of the monotonic counter shown in FIG. 3.

FIG. 4 shows a timing diagram which describes an atomic read operation 92. During atomic read operation 92, an address portion of bus 48 is stable at $T_I$, an initiation 94 of read operation 92, and remains stable until $T_T$, a termination 96 of read operation 92. During read operation 92 a read control signal (RD) from bus 48 activates and remains stable in its active state throughout read operation 92. Moreover, during read operation 92 a write control signal (WT) from bus 48 remains inactive. As is conventional, read and write control signals are configured so that both cannot be active at the same instant, although both may be inactive at the same instant. Thus, as also shown in FIG. 4 at some time following read operation 92, the write control signal (WT) activates when the read control signal (RD) remains inactive.

Accordingly, atomic read operation 92 depicted in FIG. 4 is configured so that once read operation 92 is initiated, it cannot be interrupted, and once initiated it proceeds to completion. Atomic read operation 92 may be carried out in a single read or input instruction by controller 46 (FIG. 2) or programmable processor 26 (FIG. 1).

Referring to FIGS. 3 and 4, synchronizer 90 includes an address decoder 98 which decodes specific addresses from the address portion of bus 48. A decoder output from address decoder 98 couples to respective inputs of logic gates 100 and 102, each of which implement an AND function. The read (RD) and write (WT) control signals from bus 48 respectively couple to other inputs of logic gates 100 and 102. An auxiliary input 104 couples to a third input of logic gate 100. An output of logic gate 100 provides count signal 76 and couples to binary counter 72. An interface circuit 106 has data inputs which couple to outputs of binary counter 72 and to outputs of register 84. An enable input of interface circuit 106 couples to an output of logic gate 102. Outputs from interface circuit 106 couple to the data portion of bus 48.

When a predetermined address recognized by address decoder 98 appears on bus 48 and the read control signal (RD) is active, then all bits of monotonic count value 70, including both of LSB portion 80 and MSB portion 82, are together supplied to the data portion of bus 48 to effect read operation 92. Count signal 76 is prevented from activating during read operation 92 in synchronizer 90 by using the write control signal (WT), configured to remain inactive when the read control signal (RD) is active, at logic gate 100. This prevents binary counter 72 from altering monotonic count value 70 between initiation 94 and termination 96 of read operation 92.

In the FIG. 3 embodiment, binary counter 72 performs a single count operation when address decoder 98 recognizes the same address on the address portion of bus 48 and the write control signal (WT) is active. But auxiliary input 104 may impose other conditions. For example, auxiliary input 104 may prevent count signal 76 from activating unless secure processing section 30 is operating in a trusted mode. Or, auxiliary input 104 may prevent count signal 76 from activating unless a monotonic count rate monitor (not shown) has determined that the number of activations of count signal 76 within a predetermined period of time has remained below a predetermined number.

While the logic gates and signal polarities depicted in FIGS. 3 and 4 suggest a particular polarity, different embodiments of monotonic counter 68 may be implemented using different signal polarities and gates of different logic polarities.

Figure 5:
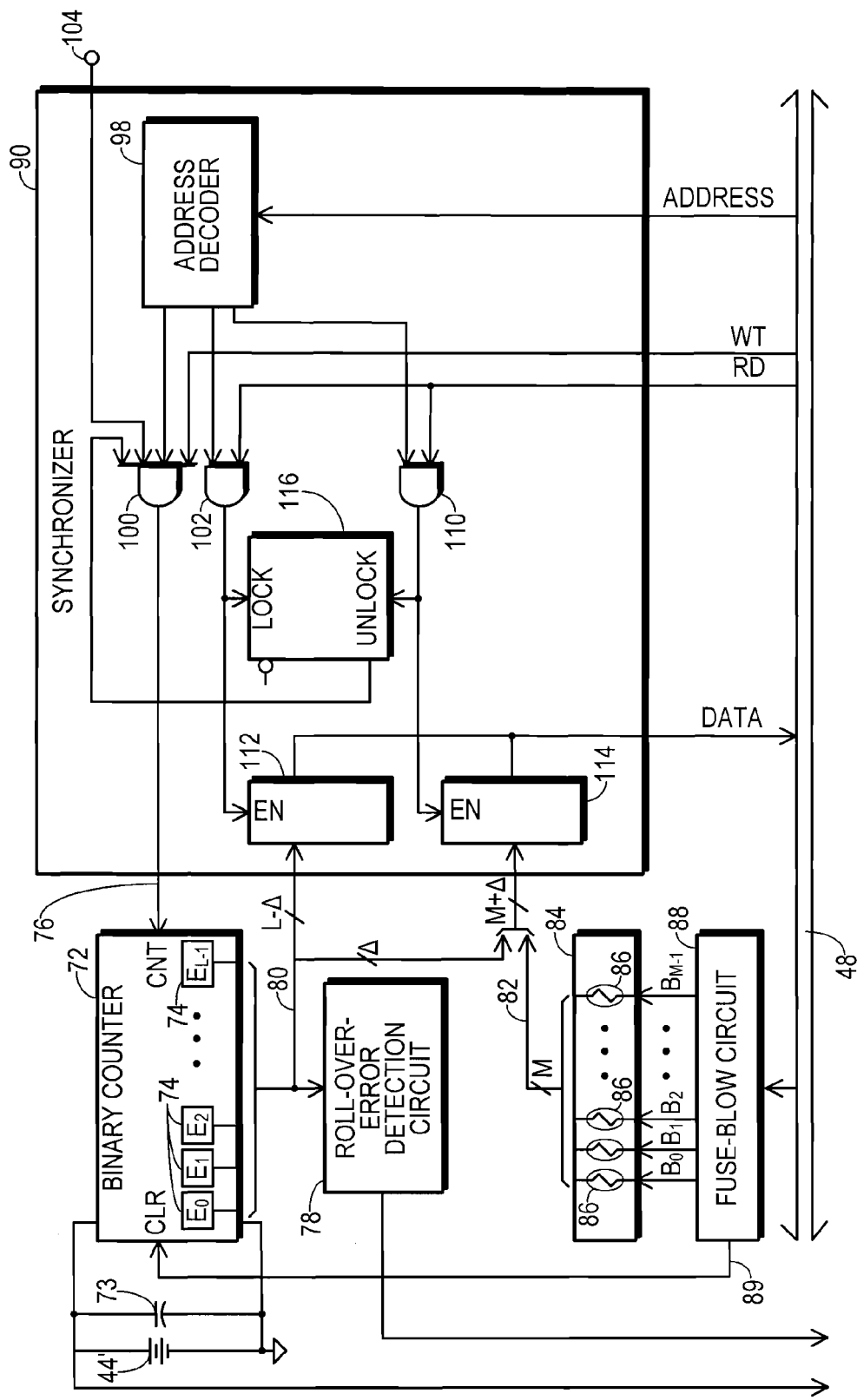
FIG. 5 shows a block diagram of a second embodiment of the monotonic counter shown in FIG. 2.
Figure 6:
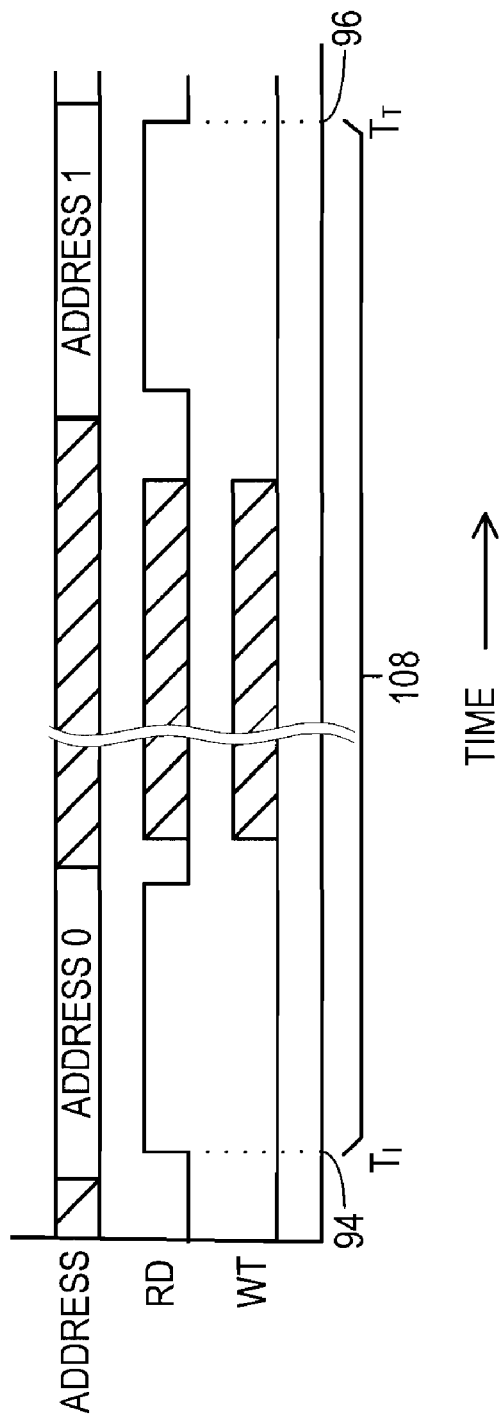
FIG. 6 shows a timing diagram which describes the operation of the monotonic counter shown in FIG. 5.

FIG. 5 shows a block diagram of a second embodiment of monotonic counter 68. FIG. 6 shows a timing diagram which describes a read operation 108 for this second embodiment of monotonic counter 68. For this second embodiment, binary counter 72, roll-over-error detection circuit 78, register 84, and fuse-blow circuit 88 all function and interconnect substantially as discussed above in connection with FIG. 3. But read operation 108 need not be an atomic read operation. Consequently synchronizer 90 differs in this second embodiment.

FIG. 6 shows that initiation 94 of read operation 108 occurs at the beginning of a first read or input instruction and that termination 96 of read operation 108 occurs at the end of a subsequent read or input instruction. Any number of intervening instructions may take place between the first and second read or input instructions. This second embodiment for monotonic counter 68 may be desirable when the data portion of bus 48 has too few bits to accommodate the entirety of monotonic count value 70 in a single instruction. For example, when the data portion of bus 48 has 32 bits but LSB portion 80 of count value 70 is expressed in 48 bits and MSB portion 82 of count value 70 is expressed in 16 bits, then two read or input instructions may be performed to implement read operation 108.

Referring to FIGS. 5 and 6, synchronizer 90 for this second embodiment of monotonic counter 68 includes address decoder 98, which decodes specific addresses from the address portion of bus 48. A first decoder output from address decoder 98 couples to a first input of logic gate 100, which is configured to implement a logical AND function. A second output from address decoder 98 couples to a first input of logic gate 102, which is configured to implement a logical AND function. A third output from address decoder 98 couples to a first input of a logic gate 110, which is configured to implement a logical AND function. The read (RD) control signal from bus 48 couples to second inputs of logic gates 110 and 102. The write (WT) control signal from bus 48 couples to a second input of logic gate 100. Auxiliary input 104 couples to a third input of logic gate 100. An output of logic gate 100 provides count signal 76 and couples to binary counter 72. An interface circuit 112 has data inputs which couple to the least significant L-A output bits from of binary counter 72, where A is an integer number. An interface circuit 114 has data inputs which couple to the most significant A output bits from of binary counter 72 along with the M bits from register 84. For the example where bus 48 has 32 data bits, L equals 48, and M equals 16, then A will also equals 16. An enable input of interface circuit 112 couples to an output of logic gate 102, and an enable input of interface circuit 114 couples to an output of logic gate 110. Outputs from interface circuits 112 and 114 couple together and to the data portion of bus 48. In addition, the output from logic gate 102 couples to a lock or reset input of a flip-flop 116 while the output from logic gate 110 couples to an unlock or set input of flip-flop 116. An unlock output from flip-flop 116 couples to a fourth input of logic gate 100.

When a first predetermined address recognized by address decoder 98 appears on bus 48 and the read control signal (RD) is active, interface circuit 112 is enabled and the least significant L-Δ bits of monotonic count value 70 are supplied to the data portion of bus 48. In addition, flip-flop 116 is placed into a locked state. With flip-flop 116 in its locked state, logic gate 100 is prevented from activating count signal 76. Later, when a second predetermined address recognized by address decoder 98 appears on bus 48 and the read control signal (RD) is active, interface circuit 114 is enabled and the most significant Δ bits of LSB portion 80 along with MSB portion 82 are supplied to the data portion of bus 48. In addition, flip-flop 116 is placed into its unlocked state.

Count signal 76 is prevented from activating during read operation 108 by placing flop-flop 116 in synchronizer 90 in its locked state at initiation 94. Flip-flop 116 may be returned to its unlocked state at the beginning of the read or input instruction whose termination coincides with termination 96. The use in synchronizer 90 of the write control signal (WT) as an input to logic gate 100 continues to prevent count signal 76 from activating throughout that instruction. This prevents binary counter 72 from altering monotonic count value 70 between initiation 94 and termination 96 of read operation 108. After termination 96 of read operation 108, count signal 76 may be activated by providing a third predetermined address that is recognized by address decoder 98 and activating the write control signal (WT). But auxiliary signal 104 may impose additional conditions, as discussed above in connection with FIG. 3.

Figure 7:
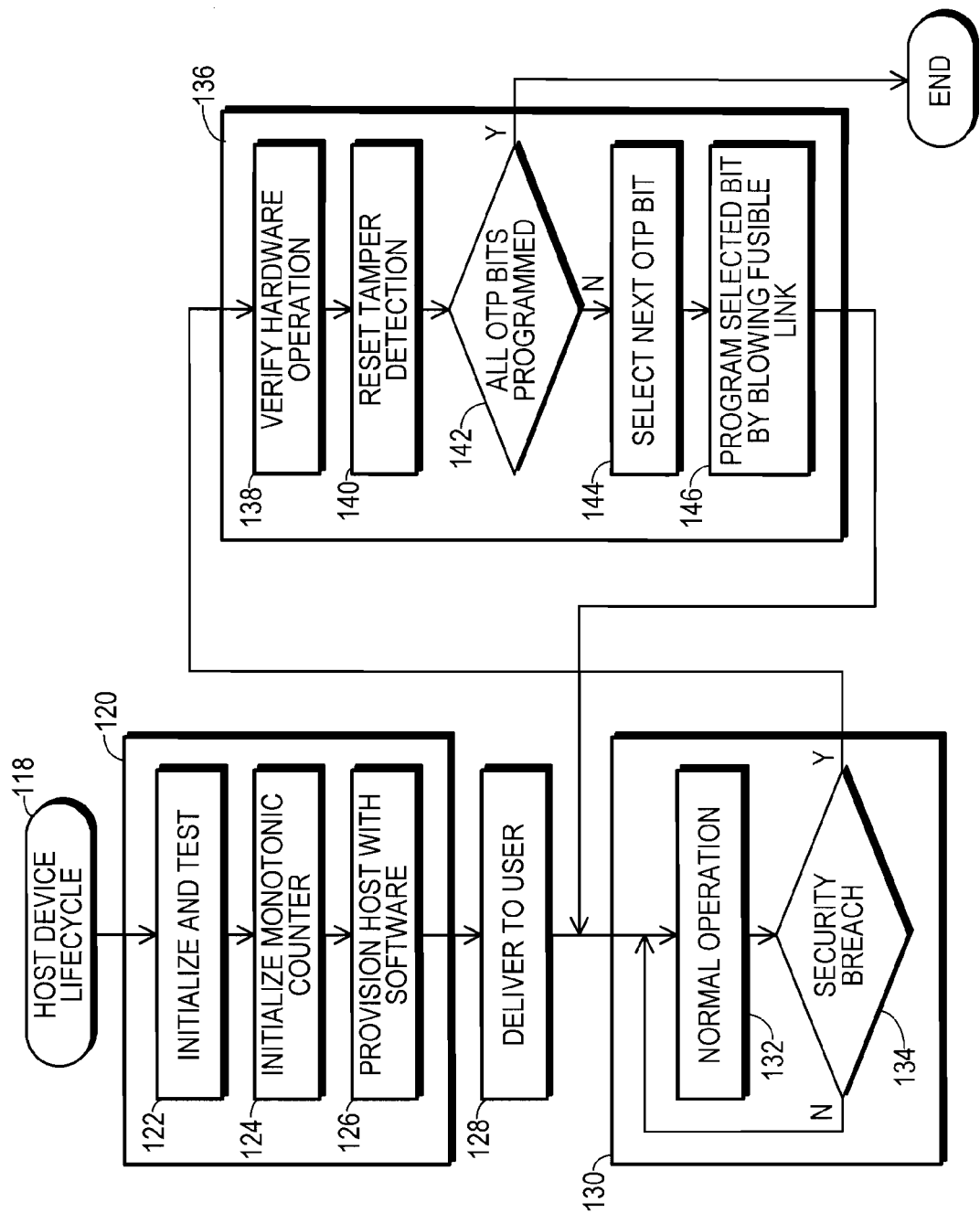
FIG. 7 shows an exemplary flow chart of a host device lifecycle process performed using the host secure computing device of FIG. 1.

FIG. 7 shows an exemplary flow chart of a host device lifecycle process 118 performed using secure computing device 14 (FIG. 1). During a manufacturing phase 120, in a task 122 a freshly manufactured host device 10 is initialized and tested to verify that hardware appears to function correctly. Then, a task 124 is performed to initialize monotonic counter 68 (FIGS. 2, 3, and 5). As discussed above, task 124 may be performed by temporarily loading trusted software 38 (FIG. 1) onto device 10 to select one of fusible links 86 (FIGS. 3 and 5) and provide the controlling inputs to fuse-blow circuit 88 (FIGS. 3 and 5) to blow the selected fusible link 86. As discussed above, in one embodiment the blowing of a fusible link 86 is the mechanism provided through output 89 of fuse-blow circuit 88 to place binary counter 72 (FIGS. 3 and 5) into a known state, such as all zeros. After the fusible link 86 is blown, this particular trusted software 38 is desirably destroyed on host device 10. Then, a task 126 is performed to provision host device 10 with its operational software 36 (FIG. 1), which may include both trusted software 38 and untrusted software 40 (FIG. 1).

Manufacturing phase 118 ends with task 126, and then a task 128 is performed to deliver host device 10 to a user. When the user is in possession of host device 10, an operational phase 130 begins. During operational phase 130, a task 132 indicates that host device 10 is operated in a normal, legitimate matter. In other words, host device 10 is operated as intended to perform any number of different applications. During operational phase 130, a query task 134 indicates that host device 10 monitors for security breaches. As discussed above, tamper detection circuit 58 (FIG. 2) represents one way in which host device 10 monitors for security breaches. So long as no security breach is detected, process flow returns to task 132 to continue normal operation. Process flow remains in operational phase 130 until a security breach is detected at task 134.

When a security breach is detected, a refurbishing operation 136 may be performed. As discussed above, when a security breach is detected many of the data security services provided by secure processing section 30 and secure processing system 12 cease to function. To the extent that host device 10 is intended to process data in a secure manner, host device 10 ceases to function. However, nothing requires host device 10 to prevent all software 36 from functioning correctly in the event of a security breach.

So long as the hardware portion of host device 10 continues to function in an acceptable manner, host device 10 may be refurbished. Refurbishing operation 136 may take place in conjunction with input from the manufacturer of host device 10. In one embodiment, host device 10 is physically returned to the manufacturer to implement refurbishing operation 136, but in another embodiment, refurbishment may take place through the use of a communication link through which refurbishing software is temporarily loaded onto host device 10 to carry out refurbishing operation 136.

Accordingly, refurbishing operation 136 includes a task 138 to verify the hardware's operation. Next, assuming that the hardware's operation is verified, a task 140 resets tamper detection circuit 58, and a query task 142 determines whether all fusible links 86 included in register 84 of one-time-programmable bits have been programmed yet. If all one-time-programmable bits have been programmed, then refurbishing operation 136 ends, and host device 10 may not be refurbished. Since no additional fusible links 86 are available to blow, no action can be taken to guarantee that future counting by monotonic counter 68 will be monotonic.

When query task 142 determines that not all of fusible links 86 have been blown, a task 144 is performed to select the next fusible link 86. Fusible links 86 may be selected for blowing in any order. After task 144, a task 146 programs the selected bit by blowing the selected fusible link 86. By blowing the selected fusible link 86 in register 84, monotonic counter 68 is reclaimed, and all future counting by monotonic counter 68 is guaranteed to be monotonic relative to all past counting. After task 146, refurbishing operation 136 is completed. Any refurbishing software temporarily loaded onto host device 10 may be destroyed. Host device 10 may be re-provisioned with software if necessary, and process 118 returns host device 10 to operational phase 130. Although in an alternate embodiment, host device 10 may first need to be returned to the user before being returned to operational phase 130.

In summary, at least one embodiment of the present invention provides a secure computing device that includes a monotonic counter which may be reclaimed after a security breach occurs. In at least one embodiment of the present invention the monotonic count value produced by the monotonic counter includes an LSB portion of bits obtained from a binary counter and an MSB portion of bits obtained from a register of one-time-programmable bits. And, in at least one embodiment of the present invention, a synchronizer is provided to supply both of the LSB and MSB portions of the monotonic count value in response to a read operation and to prevent the binary counter from altering the monotonic count value between an initiation and a termination of the read operation.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A secure computing device which produces a monotonic count value in response to a read operation, said device comprising:
   a counter configured to count in response to a count signal and to provide least significant bits of said monotonic count value;
   a roll-over detection circuit coupled to said counter and configured to detect advancement of a value presented in said least significant bits beyond a maximum value;
   a tamper detection circuit coupled to said roll-over detection circuit, said tamper detection circuit being configured to declare a security breach in response to detection of a roll over in said least significant bits of said monotonic count value;
   a register of at least one one-time-programmable bit configured to provide one or more most significant bits of said monotonic count value; and
   a synchronizer coupled to said counter and to said register, said synchronizer being configured to supply both of said least significant bits of said monotonic count value and said one or more most significant bits of said monotonic count value in response to said read operation.

2. A secure computing device as claimed in claim 1 wherein said counter is a binary counter.

3. A secure computing device as claimed in claim 1 additionally comprising a battery coupled to said counter so that said counter is continuously energized.

4. A secure computing device as claimed in claim 3 wherein:
   said register of one-time-programmable bits is a non-volatile register; and
   said counter includes volatile memory elements which remain continuously energized by said battery.

5. A secure computing device as claimed in claim 1 wherein said register is provided by at least one fusible link.

6. A secure computing device as claimed in claim 1 wherein:

said counter is an L-bit counter configured to present up to $2^L$ unique values, where L is a first integer number; and said register is an M-bit register configured to present up to M+1 unique values, where M is a second integer number.

7. A secure computing device as claimed in claim 6 where said integer L is greater than said integer M.

8. A method of operating a secure computing device having a secure processing section which provides data security services including a monotonic count value, said method comprising:

controlling a counter to produce a least significant bits portion of said monotonic count value in response to a count signal;

forming a most significant bits portion of said monotonic count value in a register of one-time-programmable bits;

supplying both of said first and second portions of said monotonic count value in response to a read operation;

evaluating said counter to detect any roll-over event from said least significant bits portion of said monotonic count value; and configuring said secure processing section to disable at least a portion of said data security services and exit an operational phase in response to said any roll-over event.

9. A method as claimed in claim 8 additionally comprising synchronizing said count signal and said read operation to prevent changes in said least significant bits portion of said monotonic count value during said read operation.

10. A method as claimed in claim 8 additionally comprising programming one of said one-time-programmable bits in response to said any roll-over event to reclaim said monotonic counter.

11. A method as claimed in claim 8 wherein:

said register of one-time-programmable bits is configured as a non-volatile register; and said counter includes volatile memory elements which remain continuously energized by a battery.

12. A method as claimed in claim 8 wherein:

said counter is an L-bit counter which presents up to $2^L$ unique values, where L is a first integer number; and said register is an M-bit register which presents up to M+1 unique values, where M is a second integer number.

13. A method as claimed in claim 8 additionally comprising detecting a security breach, wherein one of said one-time-programmable bits is programmed in response to detecting said security breach to reclaim said monotonic counter.

14. A method as claimed in claim 13 wherein:

said one of said one-time-programmable bits is programmed to cause said monotonic count value to count; and said method additionally comprises using said secure computing device after detecting said security breach.

15. A method as claimed in claim 14 wherein said secure computing device executes trusted software during said evaluating operation, and said method additionally comprises:

disabling execution of said trusted software in said secure computing device in response to said any roll-over event; and said method additionally comprises refurbishing said secure computing device after disabling execution of said trusted software to permit execution of said trusted software, wherein said one of said one-time-programmable bits is programmed during said refurbishing operation.

16. A method of operating a secure computing device having a secure processing section which provides data security services including a monotonic count value, said method comprising:

controlling a counter to produce a least significant bits portion of said monotonic count value in response to a count signal;

forming a most significant bits portion of said monotonic count value in a register of independent one-time-programmable bits;

programming one of said one-time-programmable bits;

supplying both of said least significant bits portion and most significant bits portion of said monotonic count value in response to a read operation;

synchronizing said count signal and said read operation to prevent changes in said least significant bits portion of said monotonic count value during said read operation; and configuring said secure processing section to disable at least a portion of said data security services in response to any roll-over from said least significant bits portion of said monotonic count value.

17. A method as claimed in claim 16 wherein:

said register of independent one-time-programmable bits is configured as a non-volatile register; and said counter includes volatile memory elements which remain continuously energized by a battery.

18. A method as claimed in claim 16 additionally comprising detecting, prior to programming said one of said one-time-programmable bits, a security breach in said secure computing device.

19. A method as claimed in claim 12 wherein said integer L is greater than said integer M.

20. A method as claimed in claim 16 wherein:

said counter is an L-bit counter which presents up to $2^L$ unique values, where L is a first integer number;

said register is an M-bit register which presents up to M+1 unique values, where M is a second integer number; and said integer L is greater than said integer M.

* * * * *